Figure 1:
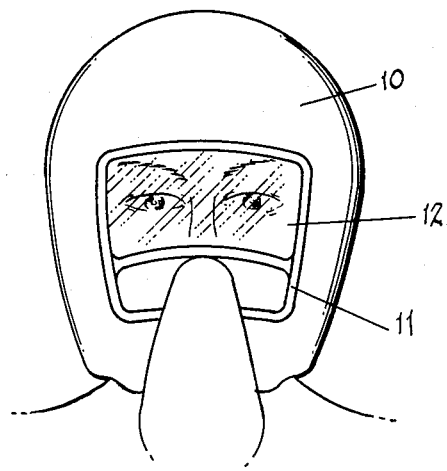

March 6, 1962   J. C. OGLE, JR., ET AL   3,024,341
HEATED FACE PLATE FOR PILOT'S HELMET
Filed Nov. 21, 1958

INVENTORS
James C. Ogle, Jr.,
Dwight W. Barkley
and Stephen H. Hartwig
BY
Nobbe & Swope
ATTORNEYS

United States Patent Office 3,024,341
Patented Mar. 6, 1962

3,024,341
HEATED FACE PLATE FOR PILOT'S HELMET
James C. Ogle, Jr., Tarentum, Dwight W. Barkley, New Kensington, and Stephen H. Harwig, Pittsburgh, Pa., assignors to Libbey-Owens-Ford Glass Company, Toledo, Ohio, a corporation of Ohio
Filed Nov. 21, 1958, Ser. No. 775,527
7 Claims. (Cl. 219—20)

This invention relates to a transparent electrically conductive article and more particularly to a heated visual face plate for an aircraft pilot's helmet.

Pilots of present day high altitude airplanes are required to constantly observe the various dials and gauges on the instrument panel within the cabin or cockpit. Present modern day aircraft are flying at extremely high altitudes and at such altitudes the temperature outside the cabin or cockpit is so low that the temperature inside the pilot's compartment may be reduced below the dew point and fogging of his face mask visor occurs. Moreover, if the windshield or canopy of the aircraft were suddenly broken the temperature around the pilot's face would drop considerably which would cause the face plate or visor on the pilot's helmet to fog or become coated with ice which would tend to obliterate the pilot's view of the instrument panel.

Another problem arising from the operation of high altitude aircraft arises when it becomes necessary for the pilot to abandon his ship while flying at these high altitudes. When such an emergency occurs the pilot is ejected from the protected interior of the aircraft to the extremely cold space through which the plane is flying. Such a sharp and sudden change in temperature causes immediate fogging or icing of the visor on the face mask carried by the pilot's helmet. This is of great concern to aircraft pilots because it has been found that when a person's vision is suddenly obliterated panic ensues.

Panic during high altitude bail-out is particularly objectionable wherein a great amount of free fall is required before the pilot's parachute is to open. If the pilot becomes panicky and loses his ability to reason during his free fall he may instinctively open his emergency parachute thus stopping his free fall at an altitude at which he will be unable to obtain sufficient oxygen for survival.

Accordingly, it is a primary object of this invention to provide an electrically heated visor for a face mask which not only receives power from an external source but also carries an independent current supply.

Another object of the invention is to provide a transparent visor for a pilot's helmet which maintains a constant temperature on the surface thereof while the pilot is in his aircraft and which is supplied from a portable source of power when the pilot bails out of the aircraft.

Another object is to provide a visor or face plate having an electrically conducting transparent film on the surface thereof which is powered by a portable supply of electrical current.

Other objects and advantages of the invention will become more apparent during the course of the following description when taken in connection with the accompanying drawings.

Figure 2:
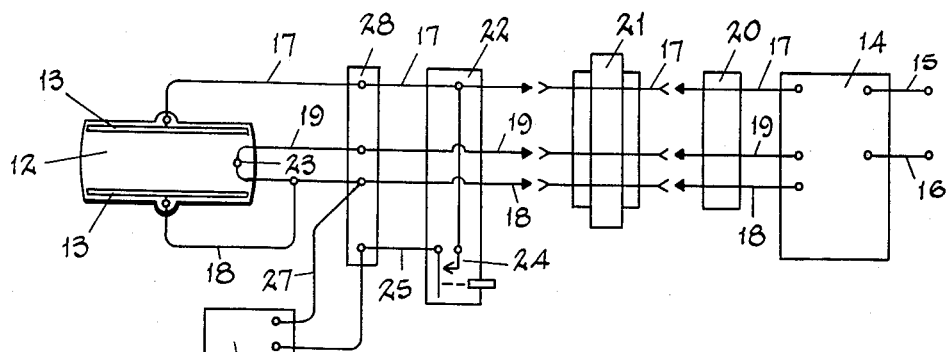

In the drawings, wherein like numerals are employed to designate like parts throughout the same:

FIG. 1 is a view of the pilot's helmet and face mask showing the novel visor of the present invention; and FIG. 2 is a block diagram of the electrical circuits utilized in the present invention.

Referring now to the drawings, there is shown in FIG. 1 an aircraft pilot's helmet 10 having a face plate 11 that carries a transparent visor 12 upon which a transparent electrically conducting film has been deposited. Examples of such films are disclosed in Patent No. 2,628,927 to W. H. Colbert et al. which issued on February 17, 1953, and the electrically conducting film may be deposited on the outer surface of the visor or the film may be carried between two laminated transparent sheets. Electric current is supplied to the film on the visor 12 by means of a pair of oppositely disposed electrodes 13 in electrical contact with marginal surface portions of the film.

In order to supply power to the various pieces of equipment carried by the aircraft, a suitable permanent source of electrical power, usually 28 volts, is provided within the aircraft. As shown in FIG. 2 a control unit 14 containing a two-tube amplifier circuit, a bridge circuit and associated relays is connected to the permanent aircraft power supply by means of conductors 15 and 16 and this control unit is used to furnish electric current to the electrodes 13. A lead 17 connects the control unit 14 to one of the electrodes 13 while another lead 18 connects the control unit 14 to not only the other electrode 13 but also a temperature control circuit that is completed by lead 19.

To permit the face mask 11 to be disconnected from the control unit 14 when the pilot normally leaves the aircraft at the termination of a flight, a connector block 20 is provided which is selectively inserted into and withdrawn from a junction box 21 by the pilot and these two elements are locked together when the aircraft is in flight. A plug 22 is normally inserted into the junction box 21 at all times but these two elements are not locked together and if the pilot is ejected from the aircraft, the plug 22 is automatically disconnected from the junction box 21.

In the preferred embodiment of the invention the temperature of the surface of the face plate 11 is controlled by the sensing element in the form of a thermistor 23 attached to the surface of the electrically conducting film. The thermistor 23 and leads 18 and 19 form one leg of the bridge circuit of the control unit 14 and the bridge circuit is balanced when the temperature of the face plate is 90° F. Upon a change of more than 5° from the required 90° F. temperature, the bridge becomes unbalanced which produces an output signal that will control a power relay within the control unit 14 which, in turn, supplies power to the electrodes 13 through leads 17 and 18. Not only is such a control system quite accurate but also it gives maximum operating control with a minimum size and weight.

Under some conditions it may be advisable to have the temperature of the face plate under the personal control of the pilot. In such cases the thermistor 23 is replaced by a conveniently located rheostat which is manually controlled and the pilot can heat the surface of the visor 12 to any desired temperature.

According to the present invention in the event of an emergency in which the pilot leaves the aircraft either by a free parachute jump or power ejection the plug 22 automatically disconnects from the junction box 21. This in turn operates a suitable micro switch 24 that connects lead 25 from a temporary source of electrical power in the form of a portable battery pack 26 to the lead 17. Inasmuch as a second lead 27 extending from the battery pack 26 is permanently connected to the lead 18 at the terminal plate 28; power is supplied directly from the battery pack 26 to the electrodes 13 for approximately 2.5 minutes. The battery pack 26 is necessarily quite small measuring ¾" x 2¼" x 6¾" and it can be carried either in the pilot's suit in the case of a free jump or on the seat pod in the case of power ejection.

When the plug 22 is disconnected from the junction box 21 the temperature control circuit becomes inactive as shown in FIG. 2 and the thermistor 23 no longer determines the current flow to the electrodes 13. Likewise if a rheostat is used in place of the thermistor, the rheostat is likewise disconnected. Thus, the battery pack 26 constantly supplies power to the face plate 12 for a time sufficient to allow the pilot to descend to a point where his parachute opens either automatically or manually.

It is to be understood that the form of the invention disclosed herein is to be taken as the preferred embodiment thereof, and that various changes in the shape, size and arrangement of parts may be resorted to without departing from the spirit of the invention or the scope of the following claims.

We claim:

1. Apparatus for supplying current to a transparent electrically heated film on the face plate of a helmet, comprising oppositely disposed electrodes in electrical contact with said film, a first source of power in the vicinity of said helmet for supplying power to said electrodes, a second source of power for supplying current to said electrodes when said helmet is removed from the vicinity of said first source, means for connecting said first source to said electrodes when said helmet is in the vicinity of said first source, temperature control means controlling the flow of current from said first source to said film, and means for deactivating said temperature control means when said helmet is moved out of the vicinity of said first source.

2. Apparatus for supplying electric current to an electrically conducting film on an aircraft pilot's face plate, comprising electrodes in electrical contact with said film, a source of power within said aircraft for supplying power to said electrodes while said pilot is within said aircraft, a portable battery pack for supplying power to said electrodes when the pilot bails out of said aircraft, temperature control means controlling the flow of current to said film, means for forming an electrical contact between said source and said electrodes during normal operation of said aircraft, disconnecting means for breaking the electrical contact between said source and said electrodes when said pilot bails out of said aircraft, said disconnecting means serving to deactivate said temperature control means when said electrical contact is broken, and means for connecting said portable battery pack to said electrodes when said electrical contact is broken.

3. Apparatus for supplying electric current to an electrically conducting film on an aircraft pilot's face plate as claimed in claim 2, wherein the temperature control means comprises a thermistor in contact with the electrically conducting film.

4. Apparatus for supplying electric current to an electrically conducting film on an aircraft pilot's face plate as claimed in claim 2, wherein the temperature control means comprises a rheostat connected to said source.

5. Apparatus for supplying current to a film on a face plate, comprising a permanent source of current for normal use of said face plate, a temporary source of current for emergency use of said face plate, means for connecting said permanent source to said film for normal use, said means comprising a control unit connected to said source to regulate the current flow, lead wires connected to said film to carry said regulated current thereto, a connector block in electrical contact with said control unit, a junction box adapted to be connected to and disconnected from said connector block to selectively supply current to said lead wires, a connector plug normally inserted in said junction box and connected to said lead wires, and means for connecting said temporary source to said lead wires during an emergency wherein said connector plug is removed from said junction box, said means comprising a micro switch in electrical contact with said temporary source and said lead wires which is actuated by the removal of said connector plug from said junction box.

6. Apparatus for supplying current to a transparent electrically heated film on the face plate of a helmet as claimed in claim 1, wherein the helmet is of the type worn by an aircraft pilot, and the second source of power comprises a portable battery pack carried by the pilot.

7. In combination with an article having electric heating means incorporated therein and wherein a current is supplied to said electric heating means from a first power source when said article is in the vicinity of said first power source and from a second power source when said article is removed from the vicinity of said first power source, temperature control means regulating the flow of current from said first source to said electric heating means and operative to maintain said electric heating means and said article at an essentially constant temperature regardless of the ambient temperature of the medium surrounding said article, and means for deactivating said temperature control means when current is supplied to said electric heating means from said second source.

References Cited in the file of this patent

UNITED STATES PATENTS

| | | |
|---|---|---|
| 1,927,001 | Lewis | Sept. 12, 1933 |
| 2,229,729 | Emde | Jan. 28, 1941 |
| 2,342,744 | McReady | Feb. 29, 1944 |
| 2,433,080 | Willett | Dec. 23, 1947 |
| 2,600,313 | Mershon | June 10, 1952 |
| 2,827,538 | Polis et al. | Mar. 18, 1958 |